(12) United States Patent
Timmons

(10) Patent No.: US 8,779,622 B2
(45) Date of Patent: Jul. 15, 2014

(54) CUSTOMIZABLE ENERGY SYSTEM AND VEHICLE

(75) Inventor: Adam T. Timmons, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 579 days.

(21) Appl. No.: 13/173,246

(22) Filed: Jun. 30, 2011

(65) Prior Publication Data
US 2013/0002013 A1  Jan. 3, 2013

(51) Int. Cl.
*H01M 8/00* (2006.01)
(52) U.S. Cl.
USPC .............................. 307/9.1; 307/10.1; 220/564
(58) Field of Classification Search
CPC ........................................................ H01M 8/00
USPC .................... 307/9.1, 10.1; 220/564
See application file for complete search history.

(56) References Cited

U.S. PATENT DOCUMENTS

| 4,554,989 A | 11/1985 | Gruich et al. |
| 6,986,401 B2 * | 1/2006 | Chernoff et al. ............... 180/311 |
| 7,849,945 B2 | 12/2010 | Ross, VII et al. |
| 2009/0145674 A1 | 6/2009 | Lee et al. |
| 2010/0198754 A1 | 8/2010 | Jones et al. |

* cited by examiner

*Primary Examiner* — Hal Kaplan
(74) *Attorney, Agent, or Firm* — Quinn Law Group, PLLC

(57) ABSTRACT

A customizable energy system for a vehicle includes a plurality of interchangeable energy modules, wherein at least one of the plurality of interchangeable energy modules is an energy storage module configured for storing a first form of energy. The customizable energy system also includes a receptacle defining at least one cavity therein and configured for operatively communicating with the plurality of interchangeable energy modules, wherein the at least one cavity is configured for receiving any one of the plurality of interchangeable energy modules. Each of the plurality of interchangeable energy modules has a substantially similar shape and is interchangeably insertable into and removable from the at least one cavity.

18 Claims, 4 Drawing Sheets

CUSTOMIZABLE ENERGY SYSTEM AND VEHICLE

TECHNICAL FIELD

The present disclosure generally relates to customizable energy systems for vehicles.

BACKGROUND

Vehicle fuel efficiency is generally constrained by vehicle weight and vehicle operating conditions. For example, quick acceleration, heavy braking, excessive idling, high speed driving, cold weather, aerodynamic drag, electrical accessories, increased vehicle weight, and terrain may each degrade vehicle fuel efficiency. In addition, as vehicle power requirements increase, vehicle fuel efficiency generally decreases.

Moreover, vehicles are manufactured to operate within a specific fuel efficiency range for a given fuel type, and are generally powered by only one or two fuel types. Often, however, vehicle power or fuel efficiency may be mismatched for a desired operating condition. For example, a vehicle suited for hauling heavy loads is often unsuitable for fuel-efficient long-distance driving. Similarly, a vehicle powered by gasoline may be more or less fuel efficient than a vehicle powered by electricity under certain driving conditions.

SUMMARY

A customizable energy system for a vehicle includes a plurality of interchangeable energy modules, wherein at least one of the plurality of interchangeable energy modules is an energy storage module configured for storing a first form of energy. The customizable energy system also includes a receptacle configured for operatively communicating with the plurality of interchangeable energy modules. The receptacle defines at least one cavity therein, and the at least one cavity is configured for receiving any one of the plurality of interchangeable energy modules. Further, each of the plurality of interchangeable energy modules has a substantially similar shape and is interchangeably insertable into and removable from the at least one cavity.

In one embodiment, at least one of the plurality of interchangeable energy modules is an energy conversion module configured for operatively communicating with the at least one energy storage module and converting the first form of energy to a second form of energy. In addition, the receptacle defines a plurality of cavities therein and is configured for operatively communicating with the plurality of interchangeable energy modules and the vehicle. Each of the plurality of cavities is configured for operatively receiving any one of the plurality of interchangeable energy modules. Further, each of the plurality of interchangeable energy modules includes an apparatus configured for operatively locking the interchangeable energy module into any one of the plurality of cavities, and at least one connector configured for mating and operatively communicating with the receptacle and another one of the plurality of interchangeable energy modules. Each of the plurality of interchangeable energy modules has a substantially similar shape and a substantially similar size, and is interchangeably insertable into and removable from any one of the plurality of cavities.

A vehicle includes at least one electric motor and a customizable energy system configured for operatively communicating with the at least one electric motor. The customizable energy system includes a plurality of interchangeable energy modules, wherein at least one of the plurality of interchangeable energy modules is an energy storage module configured for storing a first form of energy. The customizable energy system also includes a receptacle defining at least one cavity therein and configured for operatively communicating with the plurality of interchangeable energy modules. The at least one cavity is configured for operatively receiving any one of the plurality of interchangeable energy modules. Further, each of the interchangeable energy modules has a substantially similar shape and is interchangeably insertable into and removable from the at least one cavity.

The above features and other features and advantages of the present disclosure are readily apparent from the following detailed description of the best modes for carrying out the disclosure when taken in connection with the accompanying drawings.

DETAILED DESCRIPTION

Figure 1:
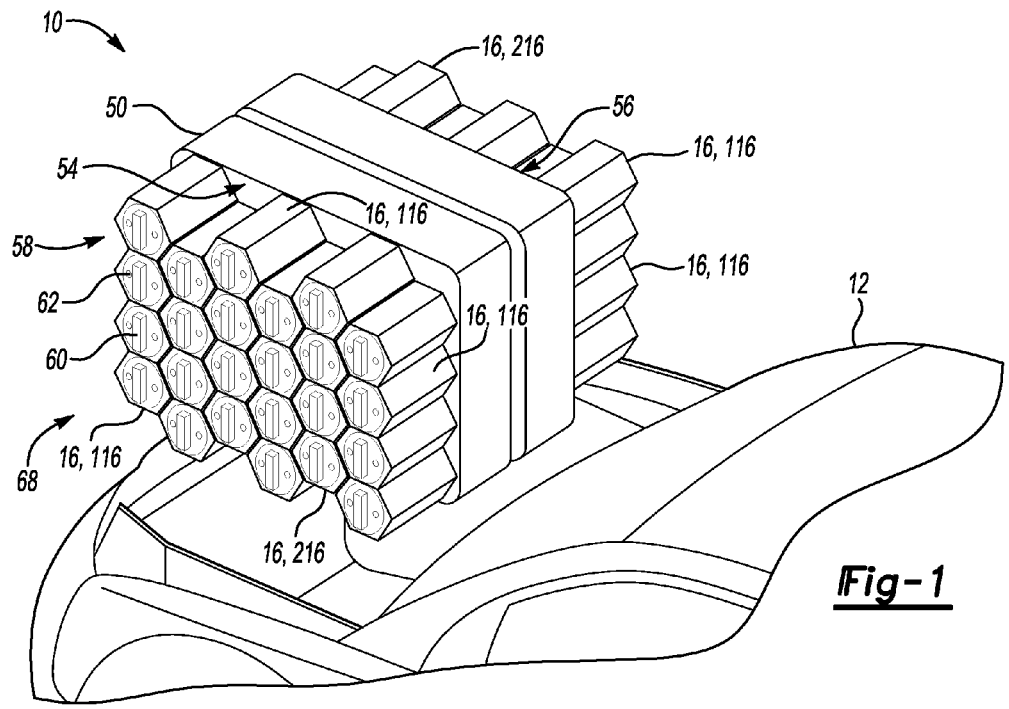
FIG. 1 is a schematic perspective fragmentary illustration of a customizable energy system for a vehicle including a plurality of interchangeable energy modules disposed in a receptacle and arranged in a first operating configuration.

Referring to the Figures, wherein like reference numerals refer to like elements, a customizable energy system 10 for a vehicle 12 is shown generally in FIG. 1. The customizable energy system 10 may be useful for customizing and/or configuring the vehicle 12 according to specific vehicle operating conditions, such as vehicle operating conditions requiring enhanced fuel efficiency or power. The customizable energy system 10 may be useful for automotive vehicles 12 powered by electricity, such as, but not limited to, hybrid electric vehicles, extended range electric vehicles, battery electric vehicles, and plug-in hybrid electric vehicles. Such automotive vehicles 12 powered by electricity may include components such as, but not limited to, a battery 28 (FIG. 3A) for energy storage, one or more electric motors 14 (FIG. 6) for vehicle propulsion, a generator 42 (FIG. 4A) for generating electricity, a mechanical transmission (not shown), and a power control system (not shown). That is, such automotive vehicles 12 may operate via wheel rotation facilitated or augmented by electrical-to-mechanical power transformation. However, the customizable energy system 10 may also be useful for non-automotive applications including, but not limited to, aviation vehicles, construction vehicles, and recreational vehicles. Further, certain components of the customizable energy system 10 may be useful as secondary energy sources for residential and industrial applications.

Referring now to FIG. 1, the customizable energy system 10 includes a plurality of interchangeable energy modules 16. Each of the plurality of interchangeable energy modules 16 may be configured to store and/or convert a first form of energy (represented generally by symbol 18 in FIGS. 3A-3C), as set forth in more detail below. Therefore, the customizable energy system 10 may provide energy to the vehicle 12.

Figure 2:
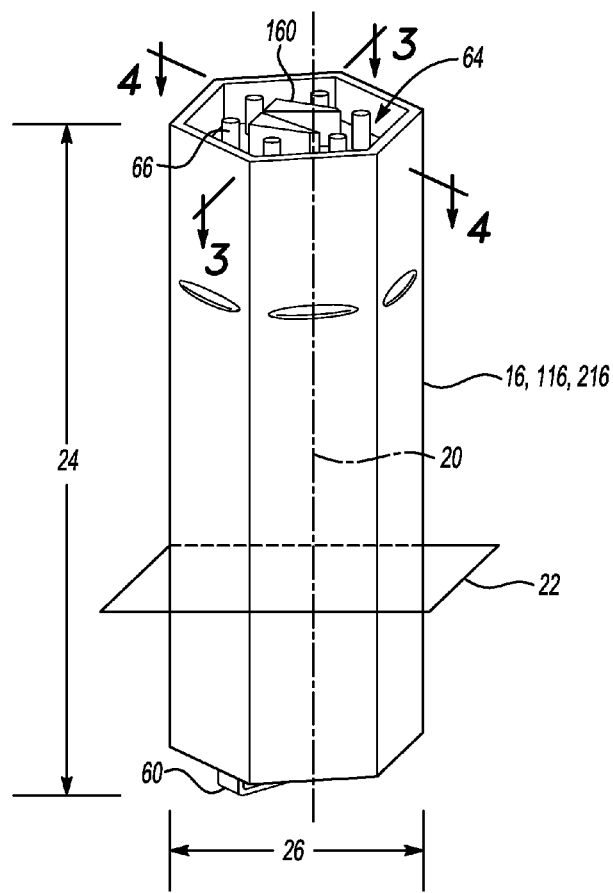
FIG. 2 is a schematic perspective illustration of one of the plurality of interchangeable energy modules of FIG. 1.

As shown generally in FIGS. 1 and 2, each of the plurality of interchangeable energy modules 16 has a substantially similar shape. In one non-limiting example described with reference to FIG. 2, each of the plurality of interchangeable energy modules 16 may have a longitudinal axis 20 and a hexagonal shape in a cross-sectional plane 22 substantially perpendicular to the longitudinal axis 20. That is, each of the plurality of interchangeable energy modules 16 may have a generally hexagonal shape. However, each of the plurality of interchangeable energy modules 16 may have any other suitable shape, e.g., a rectangular or circular shape.

Further, each of the plurality of interchangeable energy modules 16 may have a substantially similar size. By way of a non-limiting example described with reference to FIG. 2, each of the plurality of interchangeable energy modules 16 may extend along the longitudinal axis 20, have an elongated shape, and have a length 24 of from 0.25 m to about 0.75 m. Likewise, each of the plurality of interchangeable energy modules 16 may have a width 26 of from about 20 cm to about 40 cm.

Therefore, although each of the plurality of interchangeable energy modules 16 may function or operate differently as set forth in more detail below, each of the plurality of interchangeable energy modules 16 may be interchangeable with one another with respect to shape and size. In addition, each of the plurality of interchangeable energy modules 16 may have a weight of less than or equal to about 12 kg. Therefore, each of the plurality of interchangeable energy modules 16 may be easily manipulated and maneuvered by a user. That is, the plurality of interchangeable energy modules 16 may be easily exchanged within the customizable energy system 10 (FIG. 1) according to desired attributes of the customizable energy system 10 and/or operating conditions of the vehicle 12 (FIG. 1).

Figure 3C:
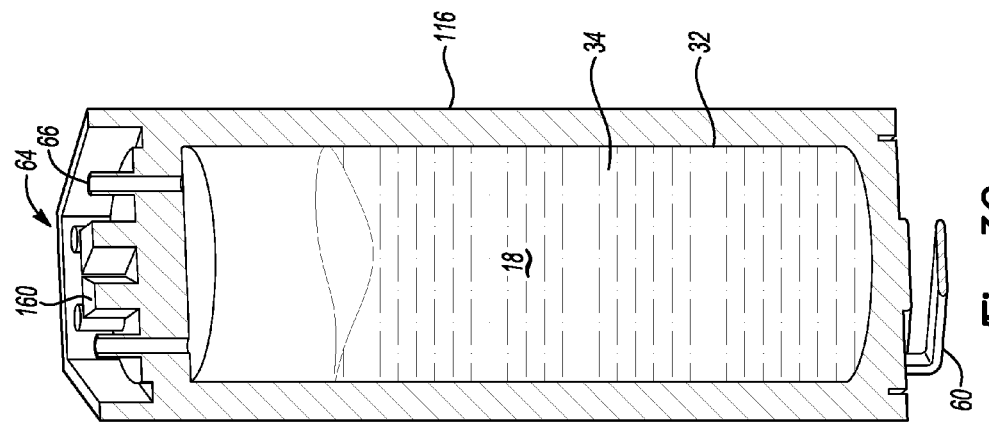
FIG. 3C is a schematic perspective partially cross-sectional illustration of an additional variation of the interchangeable energy module of FIGS. 1 and 2 taken along section lines 3-3.
Figure 3B:
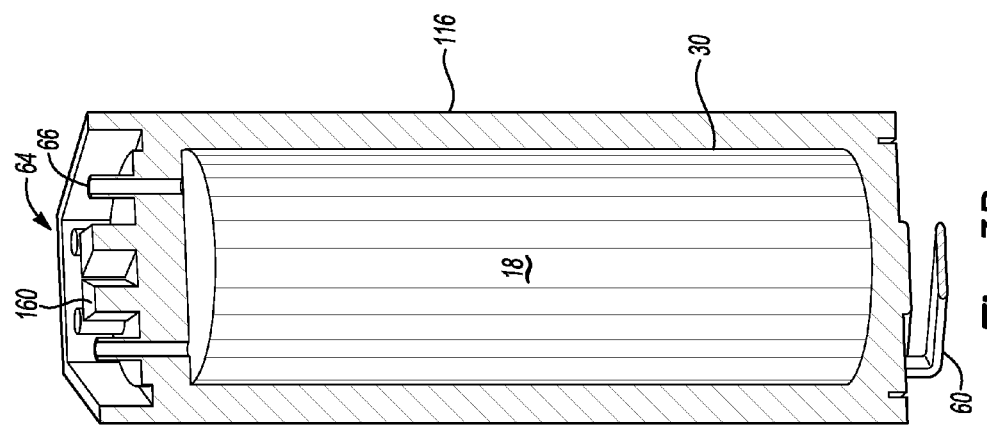
FIG. 3B is a schematic perspective partially cross-sectional illustration of another variation of the interchangeable energy module of FIGS. 1 and 2 taken along section lines 3-3.
Figure 3A:
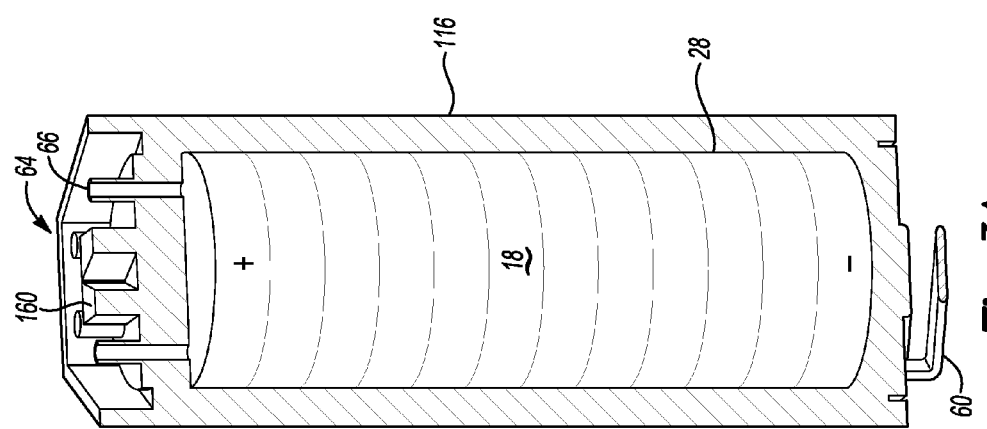
FIG. 3A is a schematic perspective partially cross-sectional illustration of one variation of the interchangeable energy module of FIGS. 1 and 2 taken along section lines 3-3.

Referring now to FIGS. 2 and 3A-3C, at least one of the plurality of interchangeable energy modules 16 is an energy storage module 116 configured for storing the first form of energy (represented generally by 18 in FIGS. 3A-3C). The first form of energy 18 may be, for example, chemical energy, mechanical energy, electrical energy, electrochemical energy, thermal energy, potential energy, or a combination thereof.

Referring to FIG. 3A, in one non-limiting example, the at least one energy storage module 116 may include a battery 28 configured for storing chemical energy. Although not shown, the energy storage module 116 may alternatively include a plurality of batteries 28, i.e., a battery stack or module. Therefore, the first form of energy 18 may be chemical energy.

Referring to FIG. 3B, in another example, the at least one energy storage module 116 may include a capacitor 30 configured for storing electrical energy. Although not shown, the energy storage module 116 may alternatively include a plurality of capacitors 30 or a supercapacitor. Therefore, the first form of energy 18 may be electrical energy.

Referring to FIG. 3C, in yet another example, the at least one energy storage module 116 may include a tank 32 configured for storing a fuel 34. That is, the energy storage module 116 may include a fuel tank. The tank 32 may be configured for storing the fuel 34 in gaseous or liquid form, and the fuel 34 may be selected according to desired operating and performance characteristics of the vehicle 12 (FIG. 1). In this example, the first form of energy 18 may be chemical energy. Suitable non-limiting examples of the fuel 34 include gasoline, diesel, hydrogen, ethanol, biodiesel, compressed natural gas, organic and/or combustible refuse, propane, methanol, and combinations thereof. Alternatively, although not shown, the energy storage module 116 may include a plurality of tanks 32 configured for storing one or more fuels 34.

Figure 4B:
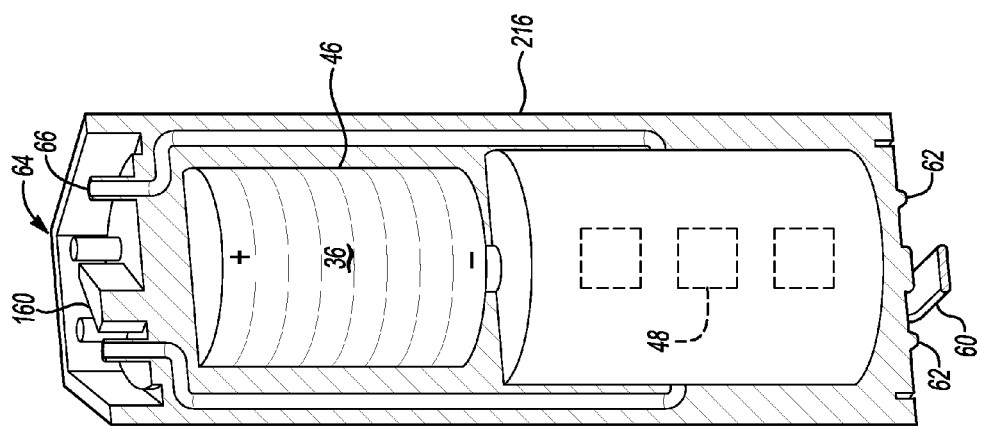
FIG. 4B is a schematic perspective partially cross-sectional illustration of another variation of the interchangeable energy module of FIGS. 1 and 2 taken along section lines 4-4.
Figure 4A:
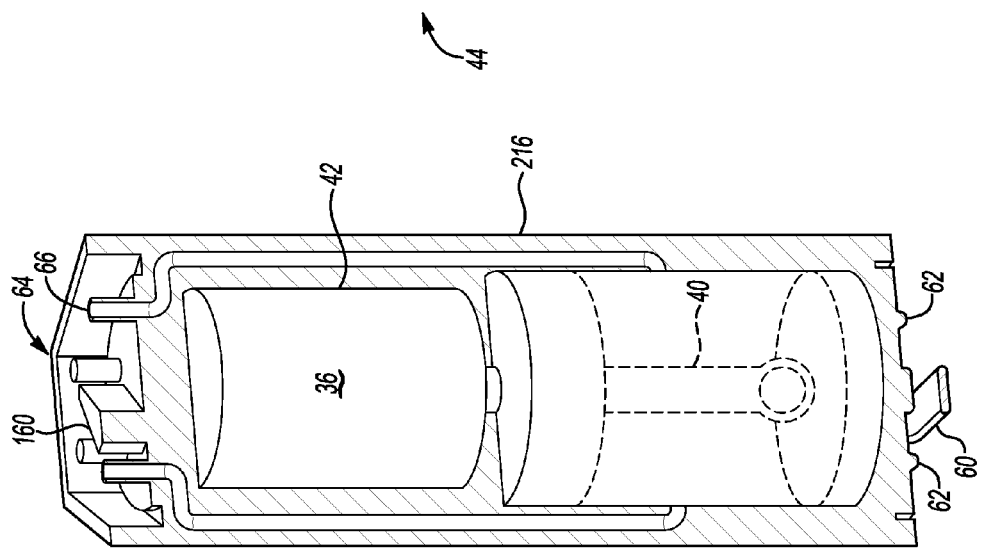
FIG. 4A is a schematic perspective partially cross-sectional illustration of one variation of the interchangeable energy module of FIGS. 1 and 2 taken along section lines 4-4.

Referring now to FIGS. 2, 4A, and 4B, at least one of the plurality of interchangeable energy modules 16 may be an energy conversion module 216 configured for operatively communicating with the at least one energy storage module 116 (FIGS. 3A-3C) and converting the first form of energy 18 (FIGS. 3A-3C) to a second form of energy (represented generally by 36 in FIGS. 4A and 4B). That is, the energy conversion module 216 may fluidly and/or electrically connect to the energy storage module 116 (FIGS. 3A-3C) within the customizable energy system 10 (FIG. 1) so that fluid, high voltage, low voltage, data, and/or mechanical signals may pass between the at least one energy conversion module 216 and the at least one energy storage module 116 (FIGS. 3A-3C). For example, fluid such as, but not limited to, intake and/or exhaust gas, liquid, and combinations thereof, may pass between the at least one energy conversion module 216 and the at least one energy storage module 116. In addition, one or more types of fluid may pass between any of the at least one energy conversion module 216 and the at least one energy storage module 116.

With continued reference to FIGS. 4A and 4B, the energy conversion module 216 may include any device, apparatus, or system configured for converting the first form of energy 18 (FIGS. 3A-3C) to the second form of energy 36 including, but not limited to, engine-generators; turbine-generators; direct current electric motors; alternating current electric motors; free-piston linear alternators; fuel cells; heat engines including, but not limited to, external and/or internal combustion piston, turbine, and/or Wankel engines fueled by gasoline, diesel, E85, ethanol, methanol, hydrogen, natural gas, and/or propane; and combinations thereof. Further, the energy conversion module 216 may convert the first form of energy 18 to thermal energy, electrical energy, chemical energy, electrochemical energy, mechanical energy, potential energy, kinetic energy, and combinations thereof. In addition, the second form of energy 36 may further be converted to another form of energy. For example, chemical energy, i.e., the first form of energy 18, may be converted to mechanical energy, i.e., the second form of energy 36, which may in turn be converted to electrical energy, i.e., another form of energy, by the energy conversion module 216. Waste heat mitigation may be provided by, for example, heat exchangers (not shown) whereby fuel and/or air, before entering a heat engine for combustion, is forced through a manifold (not shown) so as to gather waste heat; heat exchangers whereby a fluid is circulated that is chilled by a chiller (not shown), or radiatively cooled by a radiator (not shown), chiller, or another one of the plurality of interchangeable energy modules 16, 116, 216; and/or waste heat-to-energy conversion devices such as, for example, thermoelectric devices (not shown), disposed within and/or between the plurality of interchangeable energy modules 16, 116, 216. Therefore, as set forth in more detail below, the plurality of interchangeable energy modules 16, 116, 216 may be the sole source of energy storage and power production for the vehicle 12, or may augment other energy storage systems (not shown) and/or power production systems (not shown) of the vehicle 12.

Referring to FIG. 4A, in one non-limiting example, the at least one energy conversion module 216 may include an engine-generator 38 configured for converting chemical energy, i.e., the first form of energy 18 (FIGS. 3A-3C), to electrical energy, i.e., the second form of energy 36. That is, referring to FIGS. 3C and 4A, the energy conversion module 216 may consume the fuel 34 (FIG. 3C), e.g., gasoline, disposed within the tank 32 (FIG. 3C) of the same or another energy storage module 116 (FIG. 3C), or another storage tank (not shown) of the vehicle 12, and convert the first form of energy 18 (FIG. 3C), i.e., the chemical energy stored within the fuel 34, to the second form of energy 36 (FIG. 4A), i.e., electrical energy. More specifically, as shown in FIG. 4A, the engine-generator 38 may include an engine 40 coupled to a generator 42. The engine 40 may be an internal combustion engine powered by the fuel 34 (FIG. 3C), and may in turn power the generator 42 to thereby generate electricity.

In another non-limiting example described with reference to FIG. 4B, the at least one energy conversion module 216 may include a fuel cell 44 configured for converting chemical energy, i.e., the first form of energy 18 (FIG. 3C), to electrical energy, i.e., the second form of energy 36. That is, referring to FIGS. 3C and 4B, the energy conversion module 216 may consume the fuel 34 (FIG. 3C), e.g., hydrogen, disposed within the tank 32 (FIG. 3C) of the energy storage module 116 (FIG. 3C) and convert the first form of energy 18 (FIG. 3C), i.e., the chemical energy stored within the fuel 34, to the second form of energy 36 (FIG. 4B), i.e., electrical energy. More specifically, as shown in FIG. 4B, the fuel cell 44 may include a fuel cell stack 46 and a balance of plant 48, i.e., supporting subassemblies and components such as hydrators, compressors, chemical containers, manifolds, and the like. The fuel cell stack 46 may be powered by the fuel 34 (FIG. 3C), and may be replenished and/or supported by the balance of plant 48. The fuel cell 44 may generate electricity by a chemical reaction.

In addition, although not shown, it is to be appreciated that the fuel cell 44 may be disposed in the same energy conversion module 216 or in any number of energy conversion modules 216 while the balance of plant 48 may be disposed in another energy conversion module 216. That is, the customizable energy system 10 may include at least two energy conversion modules 216 that are operably connected to one another.

Suitable examples of fuel cells 44 include, but are not limited to, polymer electrolyte membrane fuel cells, direct methanol fuel cells, alkaline fuel cells, phosphoric acid fuel cells, molten carbonate fuel cells, solid oxide fuel cells, and combinations thereof.

In another embodiment, at least one of the plurality of interchangeable energy modules 16 may be an energy reformation module (not shown) that includes the tank 32 (FIG. 3C) configured for storing the fuel 34 (FIG. 3C), and a second tank (not shown) configured for storing a second fuel (not shown). That is, the energy reformation module may convert the fuel 34 to the second fuel. For example, the fuel 34 may be vegetable oil, and the second fuel may be biodiesel. In this example, the energy reformation module may include transesterification capability to convert the fuel 34 to the second fuel.

It is to be appreciated that although the plurality of interchangeable energy modules 16 may be interchangeable with respect to shape and size, each of the plurality of interchangeable energy modules 16 may be differentiated by labeling, marking, and/or color so that a user may manually or by computer and/or by telematics assistance determine whether each of the plurality of interchangeable energy modules 16 is configured as an energy storage module 116 (FIGS. 3A-3C), an energy conversion module 216 (FIGS. 4A and 4B), or an energy reformation module (not shown). Further, since the plurality of interchangeable energy modules 16 may store and/or convert the first form of energy 18, the plurality of interchangeable energy modules 16 may be useful as secondary energy sources for residential or industrial applications. For example, the plurality of interchangeable energy modules 16 may provide back-up electrical energy and/or operate as a generator 42 (FIG. 4A) to supplement electrical energy received from a local electrical power grid.

Figure 5:
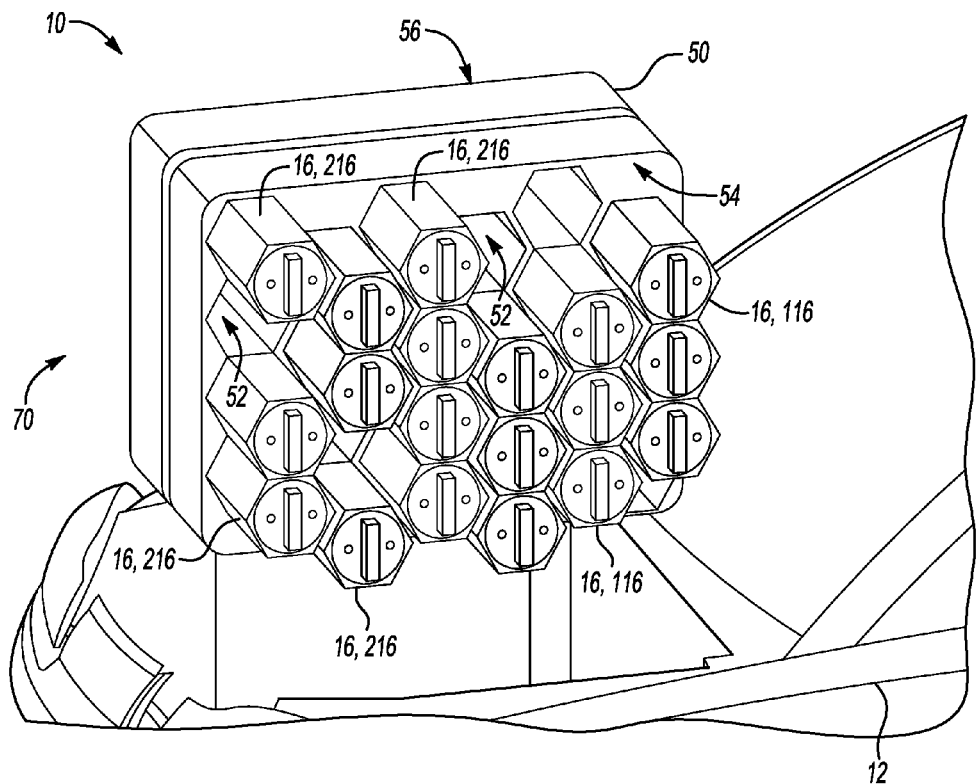
FIG. 5 is a schematic perspective fragmentary illustration of the customizable energy system of FIG. 1 arranged in a second operating configuration.

Referring now to FIGS. 1 and 5, the customizable energy system 10 further includes a receptacle 50 defining at least one cavity 52 (FIG. 5) therein and configured for operatively communicating with the plurality of interchangeable energy modules 16. As shown in FIG. 5, the at least one cavity 52 is configured for receiving any one of the plurality of interchangeable energy modules 16. The at least one cavity 52 may extend into the receptacle 50 at a depth of from about 0.25 m to greater than the length 24 of respective interchangeable energy module 16, and each of the plurality of interchangeable energy modules 16 may be disposed in one respective cavity 52 so that each of the plurality of interchangeable energy modules 16 operatively communicates with the receptacle 50 during operation of the customizable energy system 10. For example, the receptacle 50 may have a terminus (not shown) within each respective cavity 52 that is configured for mating and operatively communicating with the interchangeable energy module 16.

With continued reference to FIGS. 1 and 5, the receptacle 50 may define a plurality of cavities 52 therein. For example, the receptacle 50 may define more cavities 52 than a total number of interchangeable energy modules 16 of the customizable energy system 10. That is, as shown in FIG. 5, one or more cavities 52 may remain empty or unfilled during operation of the customizable energy system 10 so as to provide capacity for additional interchangeable energy modules 16 and/or to reduce a weight of the customizable energy system 10 during operation.

Although shown as having a generally rectangular shape in FIGS. 1 and 5, the receptacle 50 may have any shape or configuration. In one embodiment, the plurality of cavities 52 may be arranged in a generally rectangular array so as to form a honeycomb and/or hexagonal configuration. Further, as best shown in FIG. 1, the plurality of cavities 52 may be defined by two or more sides 54, 56 of the receptacle 50. Therefore, the plurality of interchangeable energy modules 16 may protrude from the two or more sides 54, 56 of the receptacle 50 when each of the plurality of interchangeable energy modules 16 is disposed within the respective cavity 52.

The receptacle 50 may operatively communicate with and receive any number of the plurality of interchangeable energy modules 16. For example, the receptacle 50 may be configured to receive and operatively communicate with from about one interchangeable energy module 16 to greater than or equal to about sixty interchangeable energy modules 16. In one variation, the receptacle 50 may receive and operatively communicate with up to about thirty interchangeable energy modules 16.

As shown in FIGS. 1 and 5, each of the plurality of interchangeable energy modules 16 may be disposed in a first position (denoted generally at 58 in FIG. 1) within the at least one cavity 52 (FIG. 5). That is, one of the plurality of interchangeable energy modules 16 may extend into one respective cavity 52 along the longitudinal axis 20 (FIG. 2) of the interchangeable energy module 16 so as to protrude from the side 54 of the receptacle 50.

With continued reference to FIGS. 1 and 2, to ensure an accurate alignment of the interchangeable energy module 16 within the respective cavity 52 (FIG. 5), each of the plurality of interchangeable energy modules 16 may include an apparatus 60, 160 configured for operatively locking the interchangeable energy module 16 into the at least one cavity 52. Referring to FIG. 1, in one non-limiting example, the apparatus 60 may include a rotatable handle configured to turn and operatively lock or seat the interchangeable energy module 16 into the respective cavity 52 so that, for example, a wedge (not shown), protrusion (not shown), or intrusion (not shown) may provide an active connection for high voltage electrical communication, low voltage electrical communication, fluid communication, data communication, and combinations thereof. In another example, as best shown in FIG. 2, the apparatus 160 may include a wedge or other protrusion having a shape that is complementary to a receiving surface (not shown) within the cavity 52. That is, as shown in FIG. 2, the apparatus 160 may be shaped to mesh with the complementary receiving surface of the cavity 52 so as to properly align the interchangeable energy module 16 within the cavity 52.

Referring again to FIG. 1, each of the plurality of interchangeable energy modules 16 may include a device 62 configured for indicating that the interchangeable energy module 16 is disposed and operatively locked within the at least one cavity 52 (FIG. 5) in the first position 58. That is, the device 62 may indicate to the user that the interchangeable energy module 16 is accurately aligned, correctly disposed within, and operatively communicating with the receptacle 50. For example, the device 62 may be a series of indicator lights that displays the position and status of the connection between the interchangeable energy module 16 and the respective cavity 52. That is, in operation, the user may insert one interchangeable energy module 16 into one open cavity 52 and engage the apparatus 60, e.g., turn the handle, until the interchangeable energy module 16 is operatively locked within the cavity 52. If the interchangeable energy module 16 is misaligned or not operatively locked within the cavity 52, a red indicator light of the device 62 may illuminate. Once the interchangeable energy module 16 is operatively locked into place within the cavity 52, but operative communication between the interchangeable energy module 16 and the receptacle 50 has not yet been established, a yellow indicator light of the device 62 may illuminate. Similarly, once the interchangeable energy module 16 is operatively communicating with the receptacle 50, a green indicator light of the device 62 may illuminate.

Referring again to FIGS. 2-4B, each of the plurality of interchangeable energy modules 16 may include at least one connector 64 configured for mating and operatively communicating with the receptacle 50 (FIG. 1) and another one of the plurality of interchangeable energy modules 16. The at least one connector 64 may be standardized or common for each of the plurality of interchangeable energy modules 16. By way of non-limiting example, the at least one connector 64 may include one or more conduits 66 for low voltage electric communication, high voltage electric communication, fluid communication, gaseous and/or exhaust communication, digital data communication, and combinations thereof. In addition, depending on whether the interchangeable energy module 16 is configured as the energy storage module 116 (FIGS. 3A-3C), the energy conversion module 216 (FIGS. 4A and 4B), or the energy reformation module (not shown), one or more of the conduits 66 may be inactive for a particular operating condition.

By way of non-limiting examples, the at least one connector 64 may include a low voltage current bus configured for conveying a data signal to the receptacle 50 (FIG. 1) and/or another one of the plurality of interchangeable energy modules 16. Alternatively or additionally, the at least one connector 64 may include a high voltage direct current or alternating current bus configured for conveying electrical energy to the receptacle 50 and/or another interchangeable energy module 16. Likewise, the at least one connector 64 may include a fluid or gas conduit 66 configured for conveying the liquid or gaseous fuel 34 (FIG. 3C), a coolant, exhaust, and combinations thereof to the receptacle 50 and/or another interchangeable energy module 16. Therefore, the receptacle 50 is configured for operatively communicating with each of the plurality of interchangeable energy modules 16, and each of the plurality of interchangeable energy modules 16 may be configured for operatively communicating with one or more other interchangeable energy modules 16.

Additionally, although not shown, each of the plurality of interchangeable energy modules 16 may include other functionality, such as, but not limited to, exhaust treatment, telematics, and/or infotainment delivery, according to a desired operating condition.

Each of the plurality of interchangeable energy modules 16 is interchangeably insertable into and removable from the at least one cavity 52 (FIG. 5). That is, since the plurality of interchangeable energy modules 16 is communized or standardized as set forth above, each of the plurality of interchangeable energy modules 16 may be interchangeably inserted into and removed from any one of the plurality of cavities 52. Stated differently, one interchangeable energy module 16 may be easily removed from the receptacle 50 and replaced with another interchangeable energy module 16. Further, since each of the plurality of interchangeable energy modules 16 is interchangeable with one another, any one cavity 52 may receive any one of the plurality of interchangeable energy modules 16. Such interchangeability allows for simplified repair and maintenance, storage, utilization, and procurement of individual interchangeable energy modules 16. In addition, a user may configure the energy and power storage and conversion attributes of the vehicle 12 (FIG. 12) according to vehicle operating conditions. For example, a user may change fuel type by interchanging one or more of the plurality of interchangeable energy modules 16. That is, for some operating conditions, the vehicle 12 may be fueled by gasoline, and for other operating conditions, the vehicle 12 may be fueled by hydrogen. The user may therefore determine and select a desired balance between weight, operating efficiency, and energy storage and conversion for the vehicle 12.

Each interchangeable energy module 16 may also include an interface (not shown) configured for communicating with an external fuel source (not shown). Therefore, each interchangeable energy module 16 may be refueled and/or replenished by connecting the interchangeable energy module 16 to a refueling conduit (not shown) at the interface. For example, referring to FIG. 3C, the tank 32 may be replenished with the fuel 34 by way of the interface. Likewise, referring to FIG. 3A, the battery 28 may be replenished with electrical energy by way of the interface. In particular, the interface may be configured to receive a refueling nozzle or pronged plug.

Referring again to FIG. 1, the receptacle 50 is also configured for operatively communicating with the vehicle 12. That is, the receptacle 50 may convey material and/or energy such as, but not limited to, high and/or low voltage electrical energy, thermal energy, mechanical energy, chemical energy, coolant, exhaust, the fuel 34, and combinations thereof to the vehicle 12. For example, the receptacle 50 may convey electrical energy to the vehicle 12, as set forth in more detail below.

In addition, as shown in FIGS. 1 and 5, the customizable energy system 10 may further include a plurality of energy storage modules 116 and a plurality of energy conversion modules 216. In one configuration, a quantity of the plurality of energy storage modules 116 may be greater than a quantity of the plurality of energy conversion modules 216 to define a first operating configuration (shown generally at 68 in FIG. 1) of the customizable energy system 10. For example, the customizable energy system 10 may include more energy storage modules 116 than energy conversion modules 216 for long-distance electric propulsion of the vehicle 12. That is, the customizable energy system 10 may include a comparatively greater quantity of energy storage modules 116 including batteries 28 (FIG. 3A) and/or capacitors 30 (FIG. 3B) as compared to a quantity of energy conversion modules 216 including engine-generators 38 (FIG. 4A).

Alternatively, a quantity of the plurality of energy conversion modules 216 may be greater than the quantity of the plurality of energy storage modules 116 to define a second operating configuration (shown generally at 70 in FIG. 5) of the customizable energy system 10. For example, the customizable energy system 10 may include less energy storage modules 116 than energy conversion modules 216 for driving conditions requiring high-power hauling of heavy loads. That is, the customizable energy system 10 may include a comparatively smaller quantity of energy storage modules 116 including batteries 28 (FIG. 3A) and/or capacitors 30 (FIG. 3B) as compared to a quantity of energy conversion modules 216 including engine-generators 38 (FIG. 4A) to thereby comparatively increase propulsion power to the vehicle 12 as necessary.

Therefore, the customizable energy system 10 may be reversibly configurable between the first operating configuration 68 (FIG. 1) and the second operating configuration 70 (FIG. 5). Stated differently, a ratio of the number of energy storage modules 116 to the number of energy conversion modules 216 may be selected and varied by the user. That is, a user may exchange any one of the plurality of interchangeable energy modules 16 to customize the energy and power delivery and storage to and within the vehicle 12.

Figure 6:
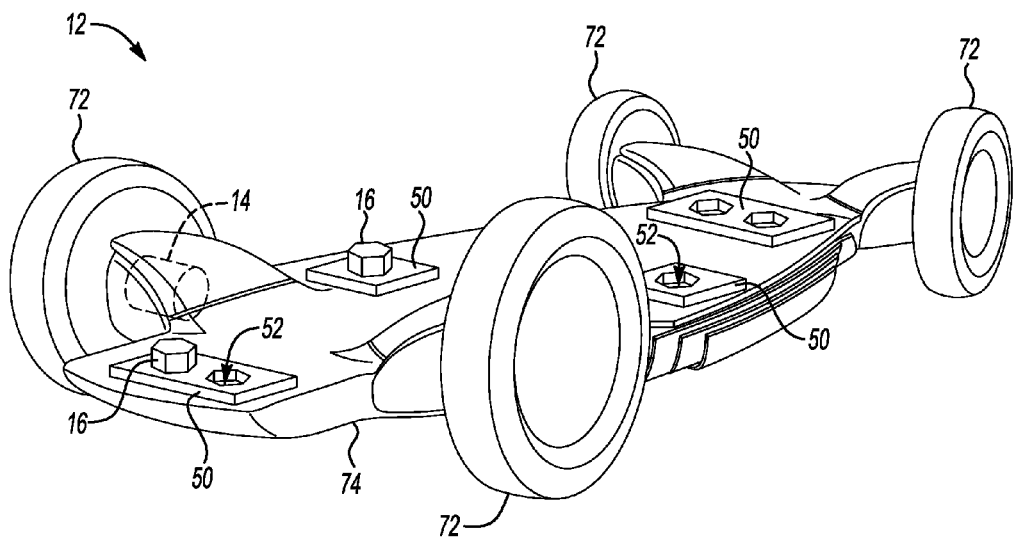
FIG. 6 is a schematic perspective illustration of a vehicle including another variation of the customizable energy system of FIGS. 1 and 5.

Referring now to FIG. 6, the vehicle 12 includes at least one electric motor 14 and the customizable energy system 10 (FIG. 1) configured for operatively communicating with the at least one electric motor 14, as set forth above. More specifically, the receptacle 50 may be configured for transferring the first form of energy 18 (FIGS. 3A-3C), e.g., electrical energy, ultimately to the at least one electric motor 14 to provide propulsion power to the vehicle 12. Similarly, the receptacle 50 may be configured to provide operative communication between two or more interchangeable energy modules 16 to store, convert, and/or transfer the first and/or second forms of energy 18, 36 (FIGS. 3A-4B) to the at least one electric motor 14. As such, the plurality of interchangeable energy modules 16 may also include additional electronics and/or data management systems (not shown). Further, although each of plurality of interchangeable energy modules 16 is shown disposed in a generally vertical position within a respective cavity 52 in FIG. 6, it is to be appreciated that the receptacle 50 may be disposed so that each of the plurality of interchangeable energy modules 16 is insertable and removable from the respective cavity 52 in a generally horizontal position, i.e., generally parallel to a plane (not shown) along which the vehicle 12 travels.

Any electric motor 14 that is configured to convert electrical energy to mechanical energy may be suitable for the vehicle 12. In addition, the vehicle 12 may include any number of electric motors 14. For example, the vehicle 12 may include one electric motor 14 per vehicle wheel 72 (FIG. 6). Alternatively, the vehicle 12 may include more than one electric motor 14 per vehicle wheel 72.

With continued reference to FIG. 6, in one embodiment, the vehicle 12 may include a vehicle frame 74 and a plurality of receptacles 50 each disposed and spaced apart from one another on the vehicle frame 74. That is, in contrast to the embodiment shown in FIG. 1, in this embodiment, the vehicle 12 may include multiple receptacles 50 disposed in multiple areas of the vehicle 12. For example, one receptacle 50 may be disposed on the vehicle frame 74 adjacent each electric motor 14. Similarly, one or more receptacles 50 may be disposed in the front, rear, or side of the vehicle 12.

Although not shown, the vehicle 12 may also include a control unit or module configured for communicating with the at least one receptacle 50 and other components of the vehicle 12. For example, the control unit or module may monitor and/or regulate state of charge, power distribution, energy density, fuel levels, propulsive power requirements, and the like to ensure optimal operating efficiency of the vehicle 12. The control unit or module may be a singular component of the vehicle 12 or may be distributed as multiple groupings in separate locations of the vehicle 12. That is, the control unit or module may function as a singular component, or may include subcomponents or groupings that function independently and/or collaboratively to communicate with the at least one receptacle 50 and other components of the vehicle 12. As a refreshed or new interchangeable energy module 16 is inserted into a respective cavity 52 (FIGS. 5 and 6), the control system may update the vehicle 12 with new powertrain capabilities. Further, the control system may maintain consistent power to each vehicle wheel 72 (FIG. 6) and ensure that a transition between fuel types and/or forms of energy 18, 36 (FIGS. 3A-4B) is seamless and imperceivable to the user.

The vehicle 12 may also include an information system (not shown) configured for conveying information to the user regarding depletion levels of each of the plurality of energy storage modules 116 and/or efficiency levels of each of the plurality of energy conversion modules 216. The information system may also provide information regarding repair facilities, retail distributors of the interchangeable energy modules 16, and/or suggested operating configurations 68, 70 for optimizing weight, handling, balance, power, energy, fuel economy, and range of the vehicle 12. For example, a user may input a desired operating mode of the vehicle 12, e.g., high power or high fuel economy mode, and/or a quantity and type of available interchangeable energy modules 16 into the information system, and the information system may suggest an optimized operating configuration 68, 70 of the customizable energy system 10. The information system may also recommend and guide placement of individual interchangeable energy modules 16 within the customizable energy system 10. Further, the information system may be an integrated component of the vehicle 12 or may be provided by a personal information device, e.g., a phone or laptop computer, removable from the vehicle 12. The information system may operate with, for example, voice communications, text communications, or vehicle telematics.

Therefore, the customizable energy system 10 and vehicle 12 are flexible, configurable, and customizable. For example, the vehicle 12 may be manufactured with a base configuration of the customizable energy system 10, and the user may customize and reconfigure the customizable energy system 10 according to desired operating conditions of the vehicle 12. In particular, the vehicle 12 may be manufactured with, for example, a 40-mile electric range, and the user may augment the customizable energy system 10 to extend the electric range of the vehicle 12 to, for example, 100 miles or more. Therefore, the vehicle 12 is adaptable to changes in regulatory and/or economic conditions. More specifically, the customizable energy system 10 may be customized in response to variations in fuel prices, fuel availability, and emission regulations. In addition, the design and aesthetics of the vehicle 12 are not constrained by a large powerplant and/or transmission assembly.

Further, as set forth above, each of the plurality of interchangeable energy modules 16, 116, 216 may store electrical energy, mechanical energy, and/or chemical energy; may convert electrical energy, mechanical energy, and/or chemical energy to another form of energy 18, 36; may provide electrical power; may provide subsystems that assist in storing electrical energy, mechanical energy, and/or chemical energy; and/or may store, convert, and/or provide energy in any combination thereof.

While the best modes for carrying out the disclosure have been described in detail, those familiar with the art to which this disclosure relates will recognize various alternative designs and embodiments for practicing the disclosure within the scope of the appended claims.

The invention claimed is:

1. A customizable energy system for a vehicle, the customizable energy system comprising:
   a plurality of interchangeable energy modules, wherein at least one of said plurality of interchangeable energy modules is an energy storage module configured for storing a first form of energy; and
   a receptacle defining at least one cavity therein and configured for operatively communicating with said plurality of interchangeable energy modules, wherein said at least one cavity is configured for receiving any one of said plurality of interchangeable energy modules;
   wherein each of said plurality of interchangeable energy modules has a substantially similar shape and is interchangeably insertable into and removable from said at least one cavity.

2. The customizable energy system of claim 1, wherein each of said plurality of interchangeable energy modules has a substantially similar size.

3. The customizable energy system of claim 2, wherein each of said plurality of interchangeable energy modules has a longitudinal axis and a hexagonal shape in a cross-sectional plane substantially perpendicular to said longitudinal axis.

4. The customizable energy system of claim 1, wherein said at least one energy storage module includes a battery configured for storing chemical energy.

5. The customizable energy system of claim 1, wherein said at least one energy storage module includes a capacitor configured for storing electrical energy.

6. The customizable energy system of claim 1, wherein said at least one energy storage module includes a tank configured for storing a fuel.

7. The customizable energy system of claim 1, wherein at least one of said plurality of interchangeable energy modules is an energy conversion module configured for operatively communicating with said at least one energy storage module and converting said first form of energy to a second form of energy.

8. The customizable energy system of claim 7, wherein said at least one energy conversion module includes a fuel cell configured for converting chemical energy to electrical energy.

9. The customizable energy system of claim 7, wherein said at least one energy conversion module includes an engine-generator configured for converting chemical energy to electrical energy.

10. The customizable energy system of claim 1, wherein each of said plurality of interchangeable energy modules includes an apparatus configured for operatively locking said interchangeable energy module into said at least one cavity.

11. The customizable energy system of claim 10, wherein each of said plurality of interchangeable energy modules includes a device configured for indicating that said interchangeable energy module is disposed and operatively locked within said at least one cavity.

12. The customizable energy system of claim 1, wherein each of said plurality of interchangeable energy modules has a weight of less than or equal to about 12 kilograms.

13. A customizable energy system for a vehicle, the customizable energy system comprising:
   a plurality of interchangeable energy modules;
   wherein at least one of said plurality of interchangeable energy modules is an energy storage module configured for storing a first form of energy;
   wherein at least one of said plurality of interchangeable energy modules is an energy conversion module configured for operatively communicating with said at least one energy storage module and converting said first form of energy to a second form of energy; and
   a receptacle defining a plurality of cavities therein and configured for operatively communicating with said plurality of interchangeable energy modules and the vehicle, wherein each of said plurality of cavities is configured for operatively receiving any one of said plurality of interchangeable energy modules;
   wherein each of said plurality of interchangeable energy modules includes an apparatus configured for operatively locking said interchangeable energy module into any one of said plurality of cavities, and at least one connector configured for mating and operatively communicating with said receptacle and another one of said plurality of interchangeable energy modules;
   wherein each of said plurality of interchangeable energy modules has a substantially similar shape and a substantially similar size, and is interchangeably insertable into and removable from any one of said plurality of cavities.

14. The customizable energy system of claim 13, wherein said plurality of interchangeable energy modules further includes a plurality of energy storage modules and a plurality of energy conversion modules, and further wherein a quantity of said plurality of energy storage modules is greater than a quantity of said plurality of energy conversion modules to define a first operating configuration of the customizable energy system, and further wherein said quantity of said plurality of energy conversion modules is greater than said quantity of said plurality of energy storage modules to define a second operating configuration of the customizable energy system.

15. The customizable energy system of claim 14, wherein the customizable energy system is reversibly configurable between said first operating configuration and said second operating configuration.

16. A vehicle comprising:
   at least one electric motor; and
   a customizable energy system configured for operatively communicating with said at least one electric motor and including;
      a plurality of interchangeable energy modules, wherein at least one of said plurality of interchangeable energy modules is an energy storage module configured for storing a first form of energy; and
      a receptacle defining at least one cavity therein and configured for operatively communicating with said plurality of interchangeable energy modules, wherein said at least one cavity is configured for operatively receiving any one of said plurality of interchangeable energy modules;
      wherein each of said plurality of interchangeable energy modules has a substantially similar shape and is interchangeably insertable into and removable from said at least one cavity.

17. The vehicle of claim 16, wherein said receptacle is configured for transferring said first form of energy to said at least one electric motor to provide propulsion power to the vehicle.

18. The vehicle of claim 16, further including a vehicle frame and a plurality of receptacles each disposed and spaced apart from one another on said vehicle frame.

* * * * *